United States Patent

[11] 3,602,798

[72] Inventors: Yasuo Shibata; Ryo Nashimoto, both of Tokyo, Japan
[21] Appl. No.: 875,215
[22] Filed: Nov. 7, 1969
[45] Patented: Aug. 31, 1971
[73] Assignee: Honda Giken Kogyo Kabushiki Kaisha Tokyo, Japan
[32] Priority: Nov. 16, 1968
[33] Japan
[31] 43/99758

[54] APPARATUS FOR PREVENTING APPLICATION OF OVERVOLTAGE TO A LOAD WHEN A SELECTIVELY OPERABLE REDUCTION GEAR MECHANISM IN A VEHICLE GEAR TRANSMISSION IS ACTIVATED
10 Claims, 3 Drawing Figs.

[52] U.S. Cl. ............................................. 322/93, 74/851, 322/98
[51] Int. Cl. ............................................... H02p 9/00
[50] Field of Search ............................................ 322/29, 30, 93, 97, 98; 317/13, 16, 20; 74/851; 290/37, 38

[56] References Cited
UNITED STATES PATENTS
| | | | |
|---|---|---|---|
| 1,685,576 | 9/1928 | Sullivan | 322/98 X |
| 2,732,834 | 1/1956 | Morgan | 74/851 X |
| 3,353,090 | 11/1967 | Sawyer | 322/30 |
| 3,400,318 | 9/1968 | Hill | 322/93 X |

Primary Examiner—Oris L. Rader
Assistant Examiner—H. Huberfeld
Attorney—Waters, Roditi, Schwartz & Nissen ABSTRACT: When a selectively operable reduction gear mechanism in a power transmission in a vehicle is activated, a battery and a load connected to a generator driven by the engine is normally subjected to overvoltage. To compensate for this overvoltage, a resistance is switched in the circuit between the generator and the battery and load to reduce the voltage, or alternatively the voltage to the load and battery is divided at the generator. This switching or division is effected by a switch which is operated by an actuator member of the reduction gear mechanism.

INVENTOR
Yasuo Shibata
BY Ryo Nashimoto

APPARATUS FOR PREVENTING APPLICATION OF OVERVOLTAGE TO A LOAD WHEN A SELECTIVELY OPERABLE REDUCTION GEAR MECHANISM IN A VEHICLE GEAR TRANSMISSION IS ACTIVATED

BRIEF SUMMARY OF THE INVENTION

In a vehicle such as a motorcycle or the like which is provided with a subsidiary reduction gear mechanism which is selectively operable in a power transmission system connecting the engine and a drive wheel, it is conventional that when the subsidiary reduction gear mechanism is operable, the engine continues to rotate at high speed, so that the output of an electric generator driven by the engine is subjected to an overvoltage, and a battery and a load, such as lamp, connected thereto are subject to damage.

An object of the invention is to provide apparatus for overcoming the above disadvantage by reducing the output voltage to the battery and load when the reduction gear mechanism is operated.

This is achieved according to the invention by an improvement wherein switch means is connected in circuit with said generator and battery and load, said switch means being operated in accordance with the operation of said reduction gear mechanism, and circuit including means coupled with said switch means to reduce the output voltage of said generator to said battery and load when the reduction gear mechanism is operated to offset voltage increase caused by the operation of the reduction gear mechanism.

In accordance with one embodiment of the invention said means to reduce the output voltage of said generator to the battery and load comprises a load resistance which is applied to the generator when the reduction gear mechanism is operated.

In accordance with another embodiment of the invention a voltage divider is operatively connected to said generator when the reduction gear mechanism is operated.

DETAILED DESCRIPTION

Figure 1:
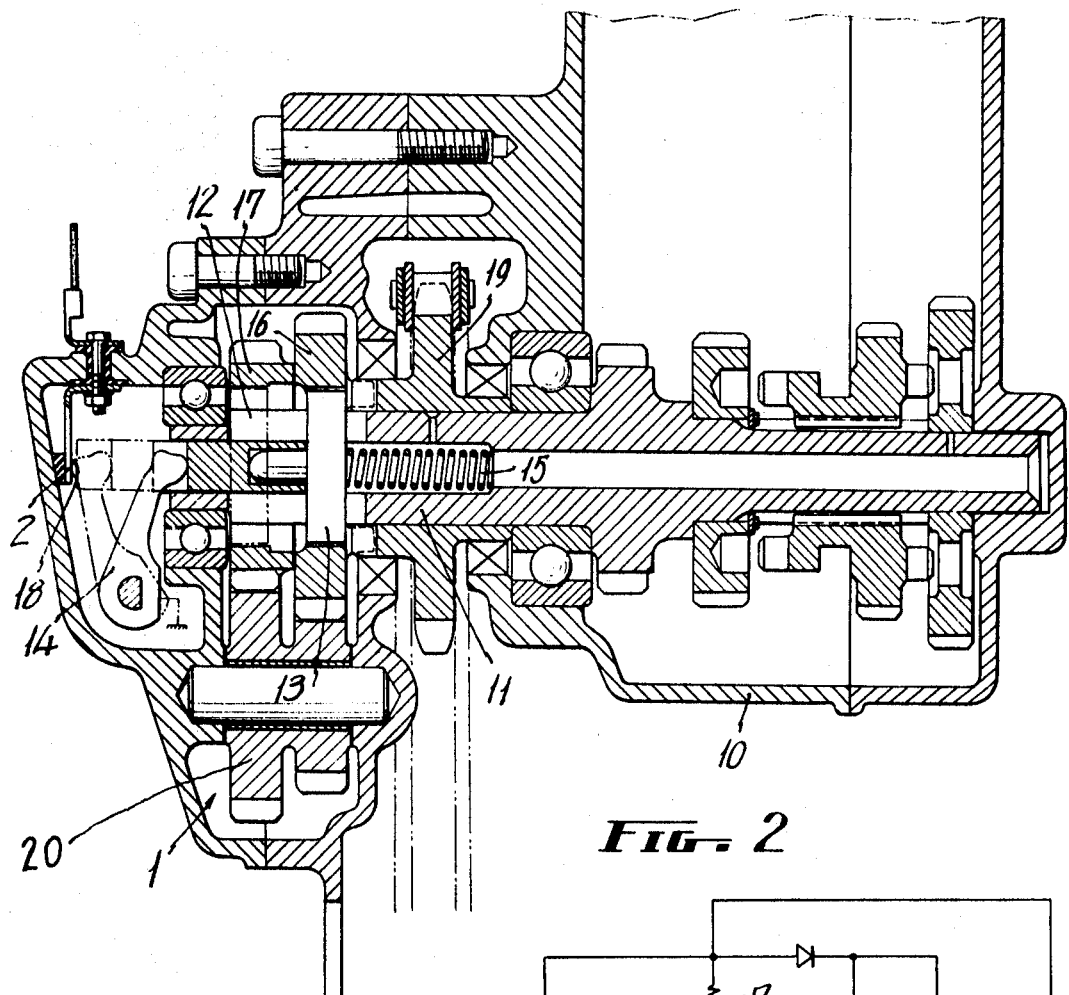
FIG. 1 is a sectional side view of an embodiment of this invention.

In a vehicle such as a motorcycle, or the like, a subsidiary reduction gear mechanism 1 is selectively operable in a power transmission system coupled between an engine and a drive wheel. An electric switch 2 is operated when the subsidiary reduction gear mechanism 1 is operative, and switch 2 is interposed in an output circuit connected between an output coil 3 of an electric generator driven by the engine, and a battery 4 and a load 5, so that the output voltage will be reduced when the switch 2 is operated.

Figure 2:
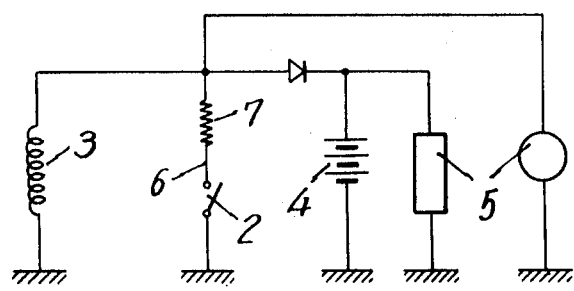
FIG. 2 is an electric circuit thereof.
Figure 3:
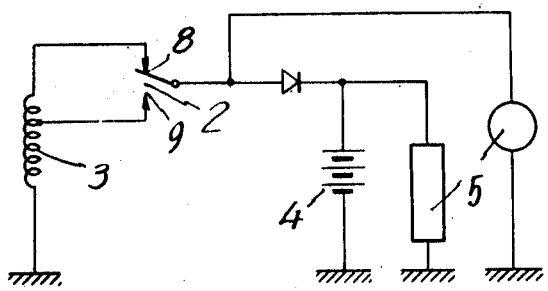
FIG. 3 is a modified electric circuit.

The circuit construction for reducing the output voltage in FIG. 2 includes a short-circuit bypass branch 6 and the switch 2 is interposed in this branch 6 in series with a bypass resistance 7. Alternatively, the output coil 3 is provided with two terminals 8 and 9 and the switch 2 is arranged to switch between the same as shown in FIG. 3. Terminal 8 is connected to the end of coil 3 and terminal 9 is connected to an intermediate divider tap on coil 3.

The subsidiary reduction gear mechanism 1 is conventional and may be, for example, adjacent a transmission 10 as shown in FIG. 1. The mechanism 1 is so constructed that the middle portion of an engaging member 13 is disposed in a longitudinal open groove 12, made in an output shaft 11 of the transmission 10, so that member 13 is slidable to the right and left (FIG. 1) for selectively being in engagement with either a first gear 16 on the right or a second gear 17 on the left. The member 13 is movable by a pivotal lever 14 against the opposition of a spring 15 such that speed reduction is not effected when the engaging member 13 is in its rightwards position in full lines. That is, the member 12 is in engagement with the first gear 16 when the lever 14 is moved to the right but it is brought into engagement with gear 17 when the lever 14 is in its leftwards position in dotted lines. The lever 14 and an outside receiving surface 18 facing it are used to form the electric switch 2. Numeral 19 denotes an output gear connected in driving relation with gear 16. The output gear 19 is either driven from gear 16, directly from member 13, or alternatively from gear 16 via member 13, gear 17 and idle gear 20 i.e. with the reduction mechanism operable.

The operation of the illustrated apparatus is as follows:

If the subsidiary reduction gear mechanism 1 is operated so as to be interposed in the power transmission system by moving the lever 14 from the position illustrated in full lines to the position illustrated in dotted lines, the electric switch 2 is operated. Accordingly, the short-circuit branch 6 is closed in the embodiment of FIG. 2, whereas in the arrangement of FIG. 3 the output terminals are switched from 8 to 9 whereby the output voltage from the output coil 3 of the electric generator may be reduced, so that the battery 4 and the load 5 to which the output voltage is applied can be protected from an overvoltage and never be damaged thereby.

Thus, according to the invention, the overvoltage which can be produced when the subsidiary reduction gear mechanism 1 is operated is prevented from occuring and thus the battery 4 and the load 5 can be protected and increased in life. Additionally, the operation is effected automatically and accurately.

What is claimed is:

1. In a vehicle having a selectively operable reduction gear mechanism in a power transmission between an engine and a wheel, and wherein a generator driven by the engine is connected with a battery and a load, an improvement wherein said power transmission is adapted to be actuated in response to a predetermined driving mode of said vehicle, including switch means connected in circuit with said generator and battery and load, said switch means being intermittently operated in accordance with the actuation of said reduction gear mechanism in response to said vehicle driving mode, said circuit including means coupled with said switch means and responsive to operation thereof to reduce the output voltage of said generator to said battery and load when the reduction gear mechanism is actuated so as to offset voltage increase caused by the operation of the reduction gear mechanism.

2. An improvement as claimed in claim 1, wherein said generator is connected in parallel with said batter and load, said means for reducing the output voltage comprising a resistance connected in parallel with said generator, battery and load, said switch means being connected in series with said resistance.

3. An improvement as claimed in claim 1, wherein said generator is connected in parallel with said battery and load, said means for reducing the output voltage comprising an intermediate tap on said generator, said switch means being connected in said circuit to operatively connect the battery and load with the intermediate tap when the reduction gear mechanism is operated.

4. An improvement as claimed in claim 1 comprising an actuation means for said reduction gear mechanism including a displaceable member movable between a first position in which the reduction gear mechanism is operative and a second position in which the reduction gear mechanism is inoperative, said switch means being positioned for operation by said displaceable member.

5. An improvement as claimed in claim 4, wherein said displaceable member is a pivotal lever.

6. An improvement as claimed in claim 4, wherein said switch means comprises a blade member positioned in the path of movement of said displaceable actuator member, said displaceable actuator member being connected as a part of said switch means so that when the actuator member contacts the blade member the switch means is closed.

7. An improvement as claimed in claim 1 comprising means coupled with the switch means and the reduction gear mechanism for conjoint operation thereof.

8. An improvement as claimed in claim 7, wherein the means coupled with the switch means and the reduction gear mechanism comprises an actuator member for selectively operating the reduction gear mechanism.

9. An improvement as claimed in claim 1, wherein said means to reduce the output voltage of said generator to the battery and load comprises a load resistance which is applied to the generator when the reduction gear mechanism is operated.

10. An improvement as claimed in claim 1, wherein said means to reduce the output voltage of said generator to the battery and load comprises a voltage divider which is operatively connected to said generator when the reduction gear mechanism is operated.